(12) United States Patent
Jain et al.

(10) Patent No.: US 11,950,215 B2
(45) Date of Patent: Apr. 2, 2024

(54) ARTIFICIAL INTELLIGENCE-BASED USER EQUIPMENT (UE) CAPABILITY BAND COMBINATION PRIORITIZATION

(71) Applicant: QUALCOMM Incorporated, San Diego, CA (US)

(72) Inventors: Hitesh Jain, Udaipur (IN); Sarath Kumar Pujari, Hyderabad (IN); Ansah Ahmed Sheik, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/374,579

(22) Filed: Jul. 13, 2021

(65) Prior Publication Data

US 2023/0012704 A1    Jan. 19, 2023

(51) Int. Cl.
*H04W 72/0453* (2023.01)
*H04L 27/26* (2006.01)
*H04W 72/51* (2023.01)
*H04W 72/56* (2023.01)

(52) U.S. Cl.
CPC ... *H04W 72/0453* (2013.01); *H04L 27/26536* (2021.01); *H04W 72/51* (2023.01); *H04W 72/56* (2023.01)

(58) Field of Classification Search
CPC . H04W 72/0453; H04W 72/51; H04W 72/56; H04L 27/26536; H04B 1/0057
See application file for complete search history.

(56) References Cited

U.S. PATENT DOCUMENTS

| | | | | |
|---|---|---|---|---|
| 2017/0181068 | A1* | 6/2017 | Salim | H04W 48/16 |
| 2018/0332430 | A1* | 11/2018 | Kumar | H04W 4/02 |
| 2019/0306925 | A1* | 10/2019 | Iskander | H04W 8/24 |
| 2021/0368568 | A1* | 11/2021 | Jangid | H04L 1/203 |
| 2022/0338188 | A1* | 10/2022 | Jain | H04W 72/0453 |
| 2022/0408290 | A1* | 12/2022 | Pujari | H04W 72/0453 |
| 2023/0088766 | A1* | 3/2023 | Qin | H04L 5/0057 |
| | | | | 370/329 |
| 2023/0232214 | A1* | 7/2023 | Uchino | H04W 8/24 |
| | | | | 455/422.1 |

* cited by examiner

*Primary Examiner* — Abdullahi Ahmed
(74) *Attorney, Agent, or Firm* — Arun Swain

(57) ABSTRACT

A method of wireless communication by a user equipment (UE) includes receiving, from a network, a capability request including a frequency band filter. The method further includes retrieving, from a server, a prioritized list of frequency band combinations based on a location of the UE. The method still further includes transmitting, to the network, the prioritized list adjusted based on the frequency band filter, in response to the capability request. A method of wireless communication by a network device includes receiving, from a UE, a request for a list of frequency band combinations based on a location of the UE. The method further includes transmitting, to the UE, a prioritized list of frequency band combinations for the location of the UE. The prioritized list is based on a selected network configured frequency band combination associated with the location of the UE.

24 Claims, 13 Drawing Sheets

| Location | Cell Id | PLMN | TAC | GPS Coordinates | History of GPS |
|---|---|---|---|---|---|
| | Cell Id = c1  902<br>Band combos: 904<br>(b1AA+n78AA), 906<br>(b3AA+n78AA) | PLMN = p1<br>Band combos:<br>(b1AA+n78AA),<br>(b3AA+n78AA),<br>(b1AA+n257AA),<br>(b3AA+n257AA),<br>(b1AA+n66AA),<br>(b3AA+n66AA) | TAC = t1<br>Band combos:<br>(b1AA+n78AA),<br>(b3AA+n78AA),<br>(b1AA+n257AA),<br>(b3AA+n257AA),<br>(b1AA+n66AA),<br>(b3AA+n66AA) | GPS = g1<br>Band combos:<br>(b1AA+n78AA),<br>(b3AA+n78AA) | GPS = g2,g3<br>Band combos:<br>(b1AA+n77AA),<br>(b3AA+n77AA),<br>(b1AA+n66AA),<br>(b3AA+n66AA) |
| | Cell Id = c2<br>Band combos:<br>(b1AA+n77AA),<br>(b3AA+n77AA) | PLMN = p2<br>Band combos:<br>(b1AA+n258AA),<br>(b3AA+n258AA),<br>(b1AA+n77AA),<br>(b3AA+n77AA),<br>(b1AA+n66AA),<br>(b3AA+n66AA) | TAC = t2<br>Band combos:<br>(b1AA+n78AA),<br>(b3AA+n78AA),<br>(b1AA+n257AA),<br>(b3AA+n257AA),<br>(b1AA+n66AA),<br>(b3AA+n66AA) | GPS = g2<br>Band combos:<br>(b1AA+n77AA),<br>(b3AA+n77AA) | |
| | Cell Id = c3<br>Band combos:<br>(b1AA+n66AA),<br>(b3AA+n66AA) | PLMN = p2<br>Band combos:<br>(b1AA+n258AA),<br>(b3AA+n258AA),<br>(b1AA+n77AA),<br>(b3AA+n77AA),<br>(b1AA+n66AA),<br>(b3AA+n66AA) | TAC = t3<br>Band combos:<br>(b1AA+n78AA),<br>(b3AA+n78AA),<br>(b1AA+n257AA),<br>(b3AA+n257AA),<br>(b1AA+n66AA),<br>(b3AA+n66AA) | GPS = g3<br>Band combos:<br>(b1AA+n66AA),<br>(b3AA+n66AA) | |

ARTIFICIAL INTELLIGENCE-BASED USER EQUIPMENT (UE) CAPABILITY BAND COMBINATION PRIORITIZATION

FIELD OF THE DISCLOSURE

The present disclosure relates generally to wireless communications, and more specifically to artificial intelligence (AI)-based prioritization of band combinations reported in user equipment (UE) capability messages.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a user equipment (UE) includes receiving, from a network, a capability request including a frequency band filter. The method further includes retrieving, from a server, a prioritized list of frequency band combinations based on a location of the UE. The method still further includes transmitting, to the network, the prioritized list adjusted based on the frequency band filter, in response to the capability request.

In other aspects of the present disclosure, a method of wireless communication by a network device includes receiving, from a user equipment (UE), a request for a list of frequency band combinations based on a location of the UE. The method further includes transmitting, to the UE, a prioritized list of frequency band combinations for the location of the UE. The prioritized list is based on a selected network configured frequency band combination associated with the location of the UE.

Other aspects of the present invention are directed to an apparatus for wireless communication by a user equipment comprising a memory, and at least one processor coupled to the memory. The one or more processor(s) is configured to receive, from a network, a capability request including a frequency band filter. The one or more processor(s) is further configured to retrieve, from a server, a prioritized list of frequency band combinations based on a location of the UE. The one or more processor(s) is still further configured to transmit, to the network, the prioritized list adjusted based on the frequency band filter, in response to the capability request.

Other aspects of the present invention are directed to an apparatus comprising a memory and one or more processor(s) coupled to the memory. The one or more processor(s) is configured to receive, from a user equipment (UE), a request for a list of frequency band combinations based on a location of the UE. The one or more processor(s) is further configured to transmit, to the UE, a prioritized list of frequency band combinations for the location of the UE. The prioritized list is based on a selected network configured frequency band combination associated with the location of the UE.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 9 is a table illustrating a band combination database maintained by a server, in accordance with aspects of the present disclosure.

DETAILED DESCRIPTION

Figure 1:
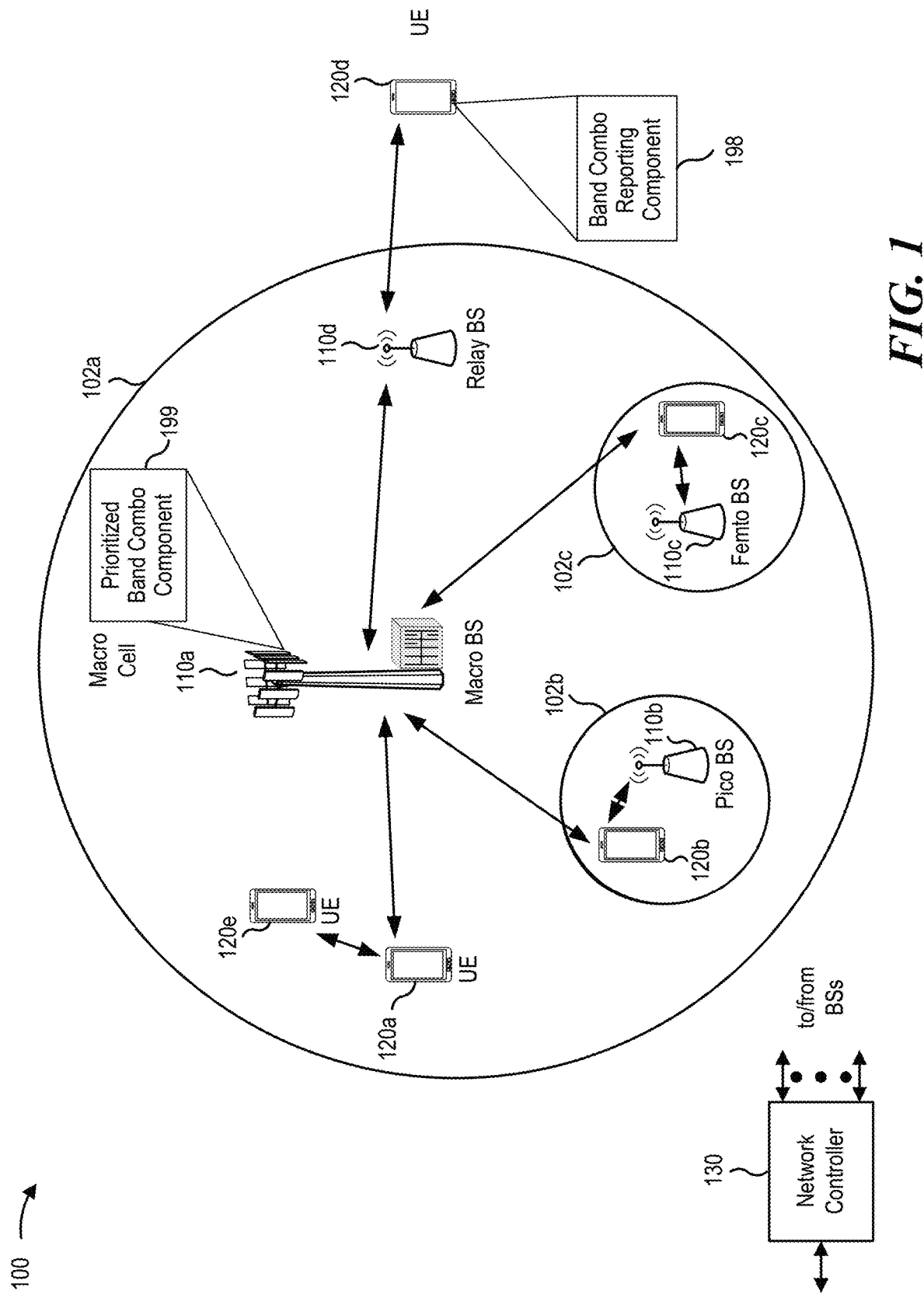
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless networks may support multiple radio access technologies (RATs), such as 5G new radio (NR) and long term evolution (LTE) (also referred to as evolved universal terrestrial radio access (E-UTRA)). The network may also support multiple frequency bands for each RAT, including bands for carrier aggregation. To communicate with a user equipment (UE), the network should be aware of the UE's radio capabilities. Each UE can have different capabilities. To learn the UE's capabilities, the network transmits a UECapabilityEnquiry message to the UE. In response to a UECapabilityEnquiry message, a UE transmits an over the air (OTA) UECapabilityInfomation message informing the network of the UE's capabilities. The UE may support NR, dual connectivity with NR, and/or LTE, for example. The UE may also support particular bands and band combinations for the different RATs. In some cases, a UE may support a large number of band combinations.

Currently, a UECapabilityInfomation message is limited to a maximum size. For example, the UECapabilityInfomation message may be limited to a maximum packet data convergence protocol (PDCP) protocol data unit (PDU) size of eight kilobytes (8 KB) for a non-standalone (NSA) deployment and nine (9) KB for a standalone (SA) deployment. Consequently, if the UE supports a larger number of band combinations beyond what fits within the UECapabilityInformation maximum PDCP PDU size, the UE trims the number of band combinations to report. Thus, support of some band combinations is not advertised. These omitted band combinations may include band combinations actually deployed by the network.

According to aspects of the present disclosure, the UE may utilize artificial intelligence to determine which band combinations the network may configure based on a current location of the UE. The UE may then prioritize those band combinations over others. In some aspects of the present disclosure, the UE requests, from a server, a list of band combinations based on the UE's current location before forming the UECapabilityInformation message. The server may be an original equipment manufacturer (OEM) server or a service carrier server.

The server may be an OEM server common to multiple UEs. In this case, band combinations configured by the network for multiple UEs based on location may be maintained. The server may be flushed and re-created periodically (such as every couple of days) to be updated with new network deployed band combinations. The server may also be a carrier-based server. A carrier-based server is maintained by a carrier based on configured band combinations for each area. The carriers already have such information, facilitating building of the server database for band combinations. In some aspects of the present disclosure, the server may intelligently keep track of a maximum mobility route of the UE for configuring band combination on neighbor cells. Thus, the server may return a most suitable configured band combination list of neighbor cells, thereby improving the mobility of the UE.

The UE may prioritize the band combinations according to the list returned by the server. In some aspects directed to improving mobility, the server may return band combinations based on band combinations configured according to the UE's current area, as well as band combinations configured according to neighbor areas. If the server returns a valid list of band combinations, the UE determines and sorts the band combination list with the network requested band filter. The UE then advertises the band combinations to the network. Aspects of the present disclosure may enhance UE coverage and reduce the size of the UECapabilityInformation message.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

In certain aspects, a UE, such as the UE 120, may include a band combination reporting component 198. The band combination reporting component 198 may receive, from a network, a capability request including a frequency band filter. The band combination reporting component 198 may also retrieve, from a server, a prioritized list of frequency band combinations based on a location of the UE, and transmit, to the network, the prioritized list adjusted based on the frequency band filter, in response to the capability request.

In certain aspects, a network device, such as the base station 110 may include a prioritized band combination component 199. The prioritized band combination component 199 may receive, from a user equipment (UE), a request for a list of frequency band combinations based on a location of the UE. The prioritized band combination component 199 may also transmit, to the UE, a prioritized list of frequency band combinations for the location of the UE. The prioritized list is based on a selected network configured frequency band combination associated with the location of the UE.

As indicated above, FIG. 1 is provided merely as an example. Other examples may differ from what is described with regard to FIG. 1.

Figure 2:
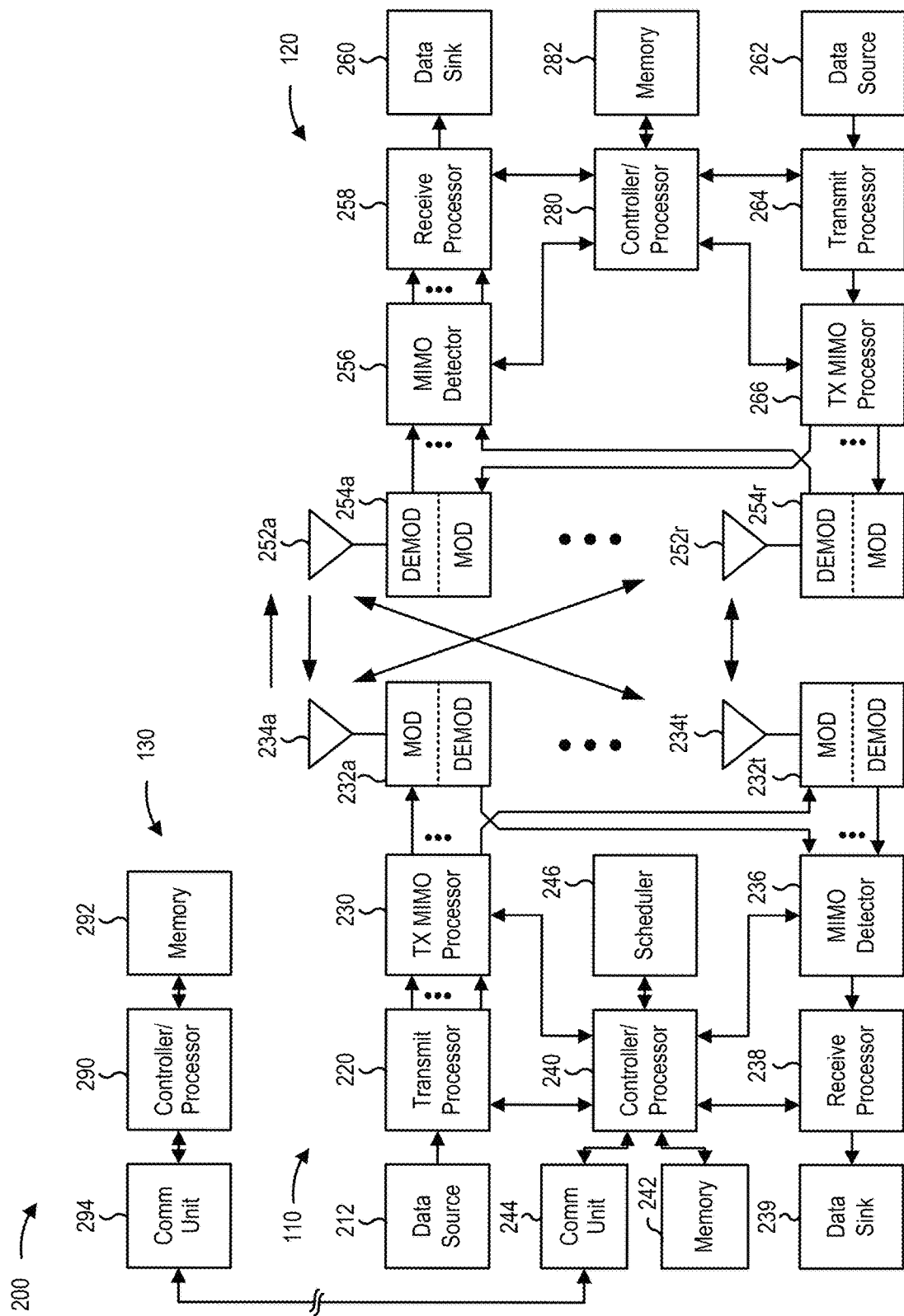
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for band combination prioritization, as described in more detail elsewhere. For example, the controller/processor 240 of the base station 110, the controller/processor 280 of the UE 120, and/or any other component(s) of FIG. 2 may perform or direct operations of, for example, the processes of FIGS. 11 and 12 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for retrieving, and means for transmitting. In some aspects, the network device (e.g., the base station 110) may include means for receiving, means for transmitting, and means for determining. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
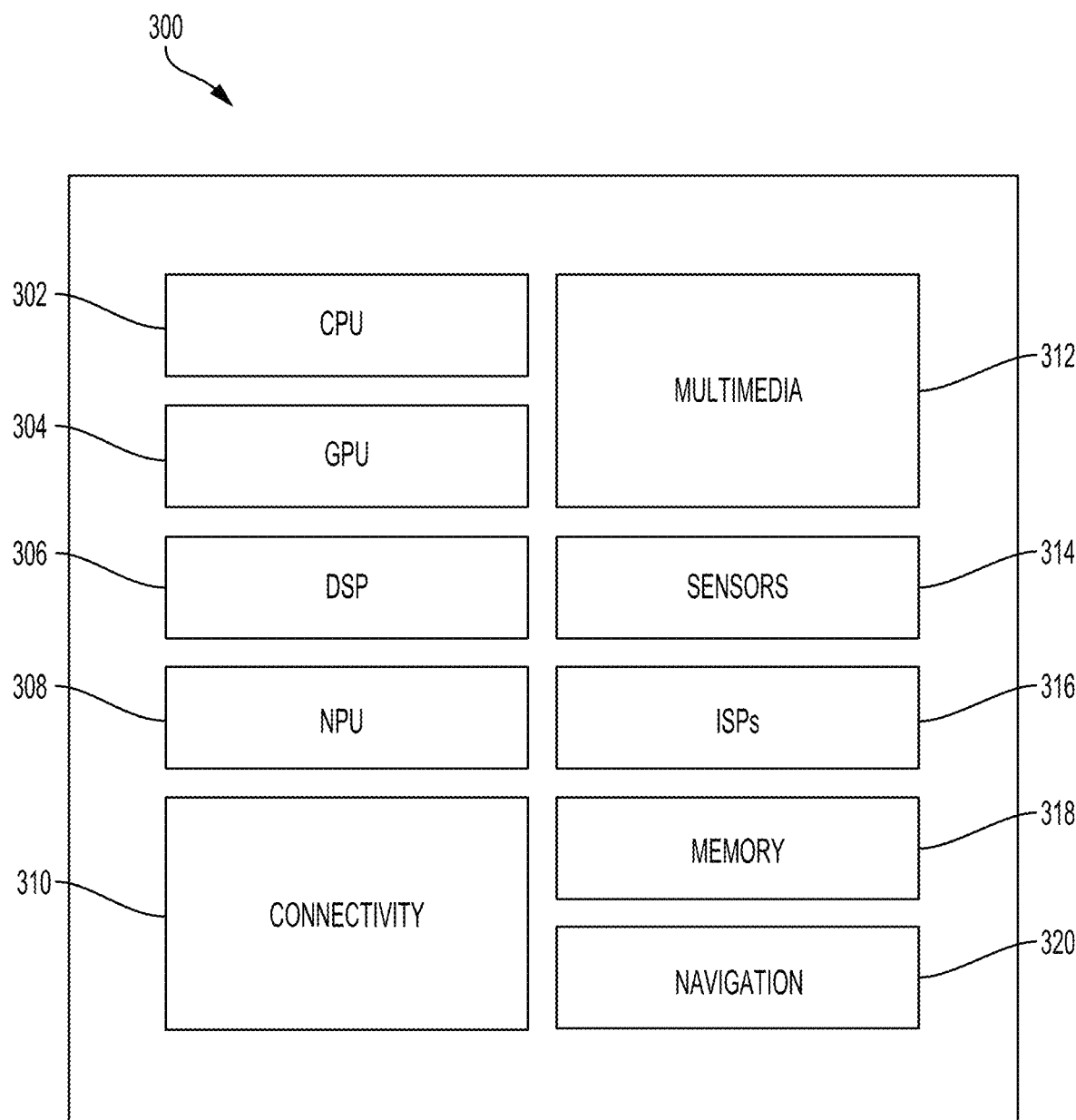
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In aspects of the present disclosure, the instructions loaded into the general-purpose processor 302 may comprise code to receive, from a network, a capability request including a frequency band filter. The instructions may also comprise code to retrieve, from a server, a prioritized list of frequency band combinations based on a location of the UE. The instructions may further comprise code to transmit, to the network, the prioritized list adjusted based on the frequency band filter, in response to the capability request. The instructions may also include code to receive, from a user equipment (UE), a request for a list of frequency band combinations based on a location of the UE. The instructions may further include code to transmit, to the UE, a prioritized list of frequency band combinations for the location of the UE.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
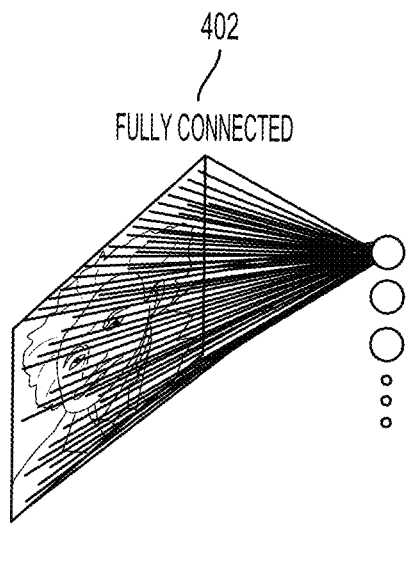
FIGS. 4A, 4B, and 4C are diagrams illustrating a neural network, in accordance with aspects of the present disclosure.
Figure 4B:
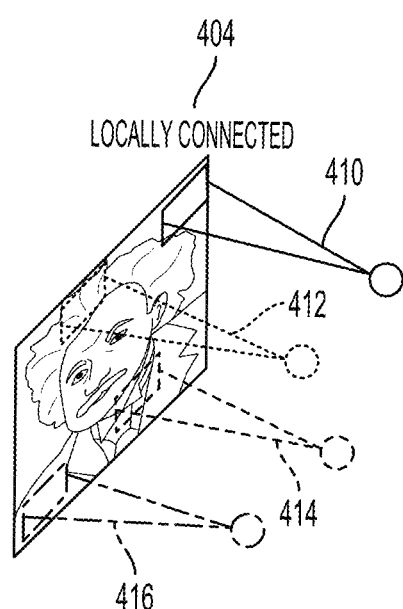

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
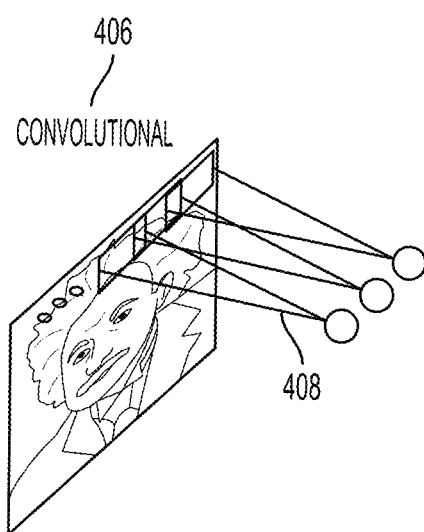

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
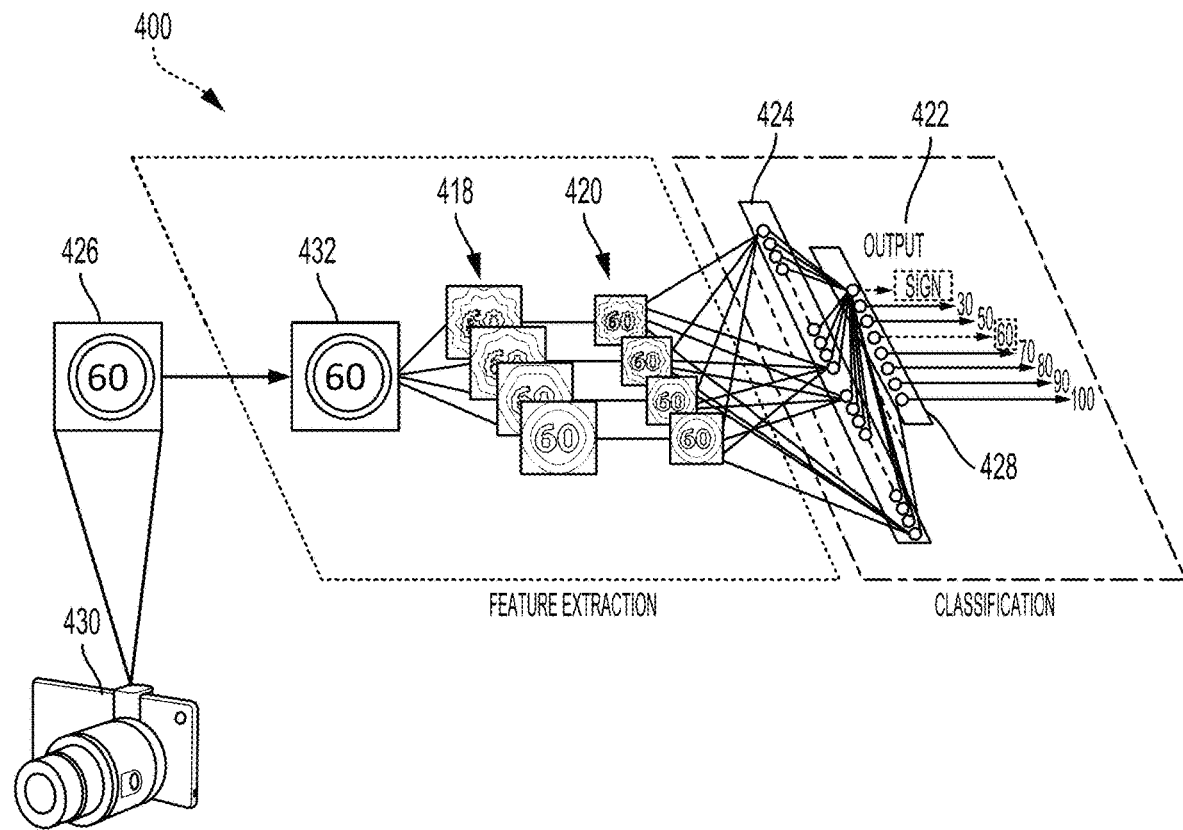
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
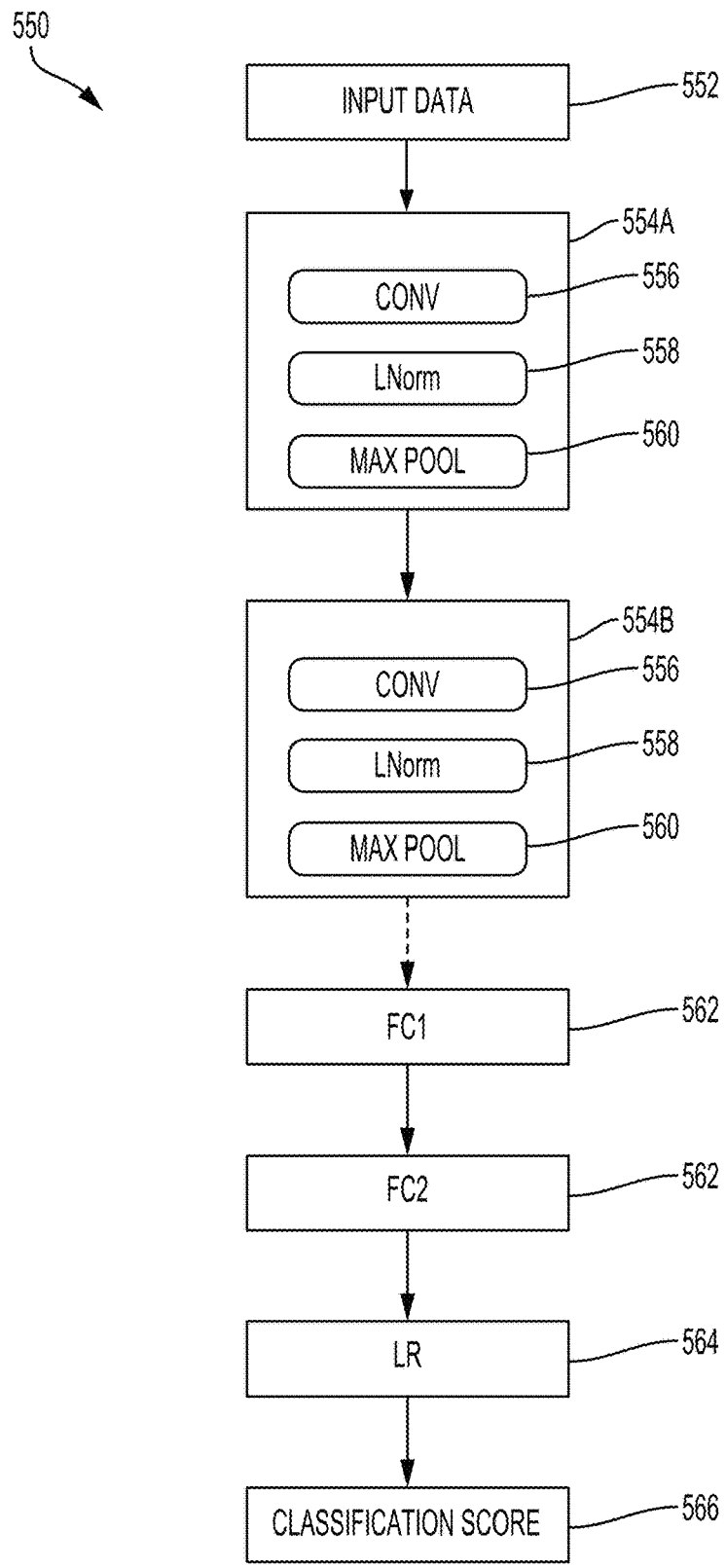
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Wireless networks may support multiple radio access technologies (RATs), such as 5G new radio (NR) and long term evolution (LTE) (also referred to as evolved universal terrestrial radio access (E-UTRA)). The network may also support multiple frequency bands for each RAT, including bands for carrier aggregation. To communicate with a user equipment (UE), the network should be aware of the UE's radio capabilities. Each UE can have different capabilities. To learn the UE capabilities, the network transmits a UECapabilityEnquiry message to the UE. In response to a UECapabilityEnquiry message, a UE transmits an over the air (OTA) UECapabilityInfomation message informing the network of the UE capabilities. The UE may support NR, dual connectivity with NR, and/or LTE, for example. The UE may also support particular bands and band combinations for the different RATs. In some cases, a UE may support a large number of band combinations.

Currently, a UECapabilityInfomation message is limited to a maximum size. For example, the UECapabilityInfomation message may be limited to a maximum packet data convergence protocol (PDCP) protocol data unit (PDU) size of eight (8) KB for a non-standalone (NSA) deployment and nine (9) KB for a standalone (SA) deployment. Consequently, if the UE supports a larger number of band combinations beyond what fits within the UECapabilityInformation maximum PDCP PDU size, the UE trims the number of band combinations to report. Thus, support of some band combinations is not advertised. These omitted band combinations may include band combinations actually deployed by the network.

Figure 6:
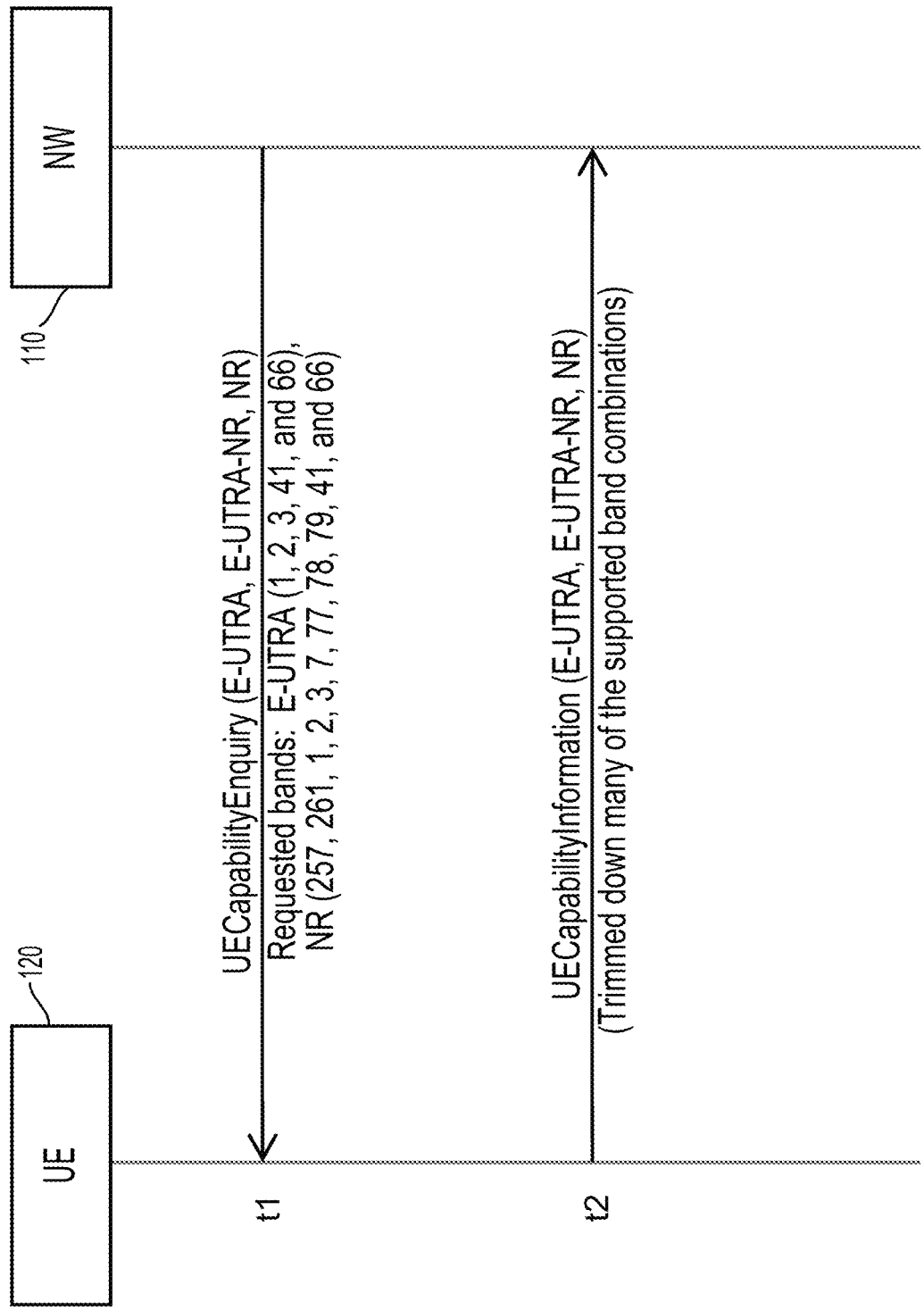
FIG. 6 is a call flow diagram illustrating conventional user equipment (UE) and network communications.

FIG. 6 is a call flow diagram illustrating conventional user equipment (UE) and network communications. In FIG. 6, a network (NW) device, such as a base station 110, communicates with a UE 120 to obtain capability information from the UE 120. The base station 110 requests the UE capabilities at time t1. The request may occur during a registration procedure, for example. In the example shown in FIG. 6, the UECapabilityEnquiry message indicates network support for bands (in priority order): 1, 2, 3, 41, and 66 for LTE (e.g., E-UTRA). The message indicates support for NR bands (in priority order): 257, 261, 1, 2, 3, 7, 77, 78, 79, 41, and 66. The message further indicates support for LTE, NR, and dual connectivity with NR and LTE.

In response to the request, at time t2, the UE 120 responds with a UECapabilityInformation message. The UECapabilityInformation message advertises supported band combinations, filtered in accordance with the network requested band order. Because the number of band combinations to report is limited by message size, the UE trims down the number of supported band combinations in the UECapabilityInformation message. It would be desirable to optimize the advertised band combinations, for example, based on service carrier (e.g., public land mobile network (PLMN)) or user/manufacturer preferred band combinations stored in the UE's memory.

According to aspects of the present disclosure, the UE may utilize artificial intelligence to determine which band combinations the network may configure based on a current location of the UE. The UE may then prioritize those band combinations over others. In some aspects of the present disclosure, the UE requests, from a server, a list of band combinations based on the UE's current location (or area) before forming the UECapabilityInformation message. The server may be an original equipment manufacturer (OEM) server or a service carrier server. The UE may prioritize the band combinations according to the list returned by the server. In some aspects directed to improving mobility, the server may return band combinations based on band combinations configured according to the UE's current location (or area), as well as band combinations configured according to neighbor areas. If the server returns a valid list of band combinations, the UE determines and sorts the band combination list with the network requested band filter. The UE then advertises the band combinations to the network. Aspects of the present disclosure may enhance UE coverage and reduce the size of the UECapabilityInformation message.

Figure 7:
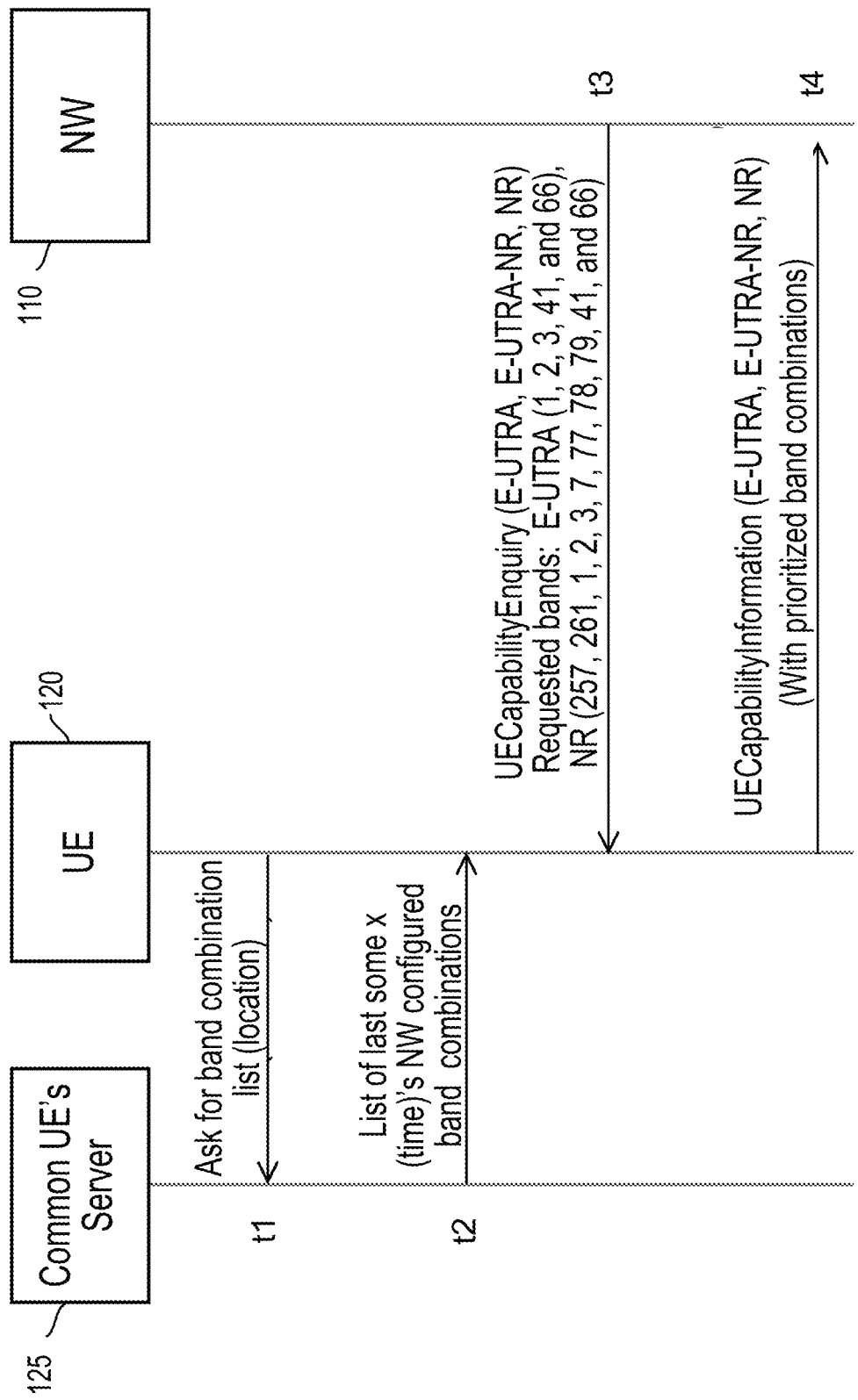
FIG. 7 is a call flow diagram illustrating an example of a method of prioritizing band combinations, in accordance with aspects of the present disclosure.

FIG. 7 is a call flow diagram illustrating an example of a method of prioritizing band combinations, in accordance with aspects of the present disclosure. In FIG. 7, a UE 120 communicates with a network (NW) device, such as a base station 110, and also a server 125 to determine an improved band combination list to advertise to the network. At time t1, the UE 120 transmits its location to the server 125 along with a request for a band combination list. The location may be global positioning system (GPS) coordinates, a tracking area code (TAC), a public land mobile network (PLMN) identifier (ID), a cell ID, or a history of GPS coordinates, for example.

At time t2, the server 125 transmits a list of network configured band combinations, based on the location of the UE 120. The list may cover a period of time. For example, the list may cover band combinations seen during the most recent twelve hours. The list may further improve mobility by including prioritized band combinations for neighbor cells.

In some aspects of the present disclosure, the server 125 may return an empty list of band combinations, for example, if the server database is not sufficiently built. The UE 120 may fall back to legacy behavior based on the server 125 returning the empty list. The server 125 may also randomly provide empty lists to the UE 120, to determine whether the network 125 has configured new band combinations, facilitating the server's AI learning.

The base station 110 requests the UE capabilities at time t3. In the example shown in FIG. 7, the UECapabilityEnquiry message indicates network support for LTE (e.g., E-UTRA) bands (in priority order): 1, 2, 3, 41, and 66. The message indicates support for NR bands (in priority order): 257, 261, 1, 2, 3, 7, 77, 78, 79, 41, and 66. The message further indicates support for LTE, NR, and dual connectivity with NR and LTE.

In response to the request, at time t4, the UE 120 responds with a UECapabilityInformation message. The UECapabilityInformation message advertises supported band combinations, filtered in accordance with the network requested band order. The supported band combinations are based on the list received from the server 125 at time t2.

The server 125 may be an OEM server common to multiple UEs. In this case, band combinations configured by the network for multiple UEs based on location may be maintained. The server 125 may be flushed and re-created periodically (such as every couple of days) to be updated with new network deployed band combinations.

Figure 8:
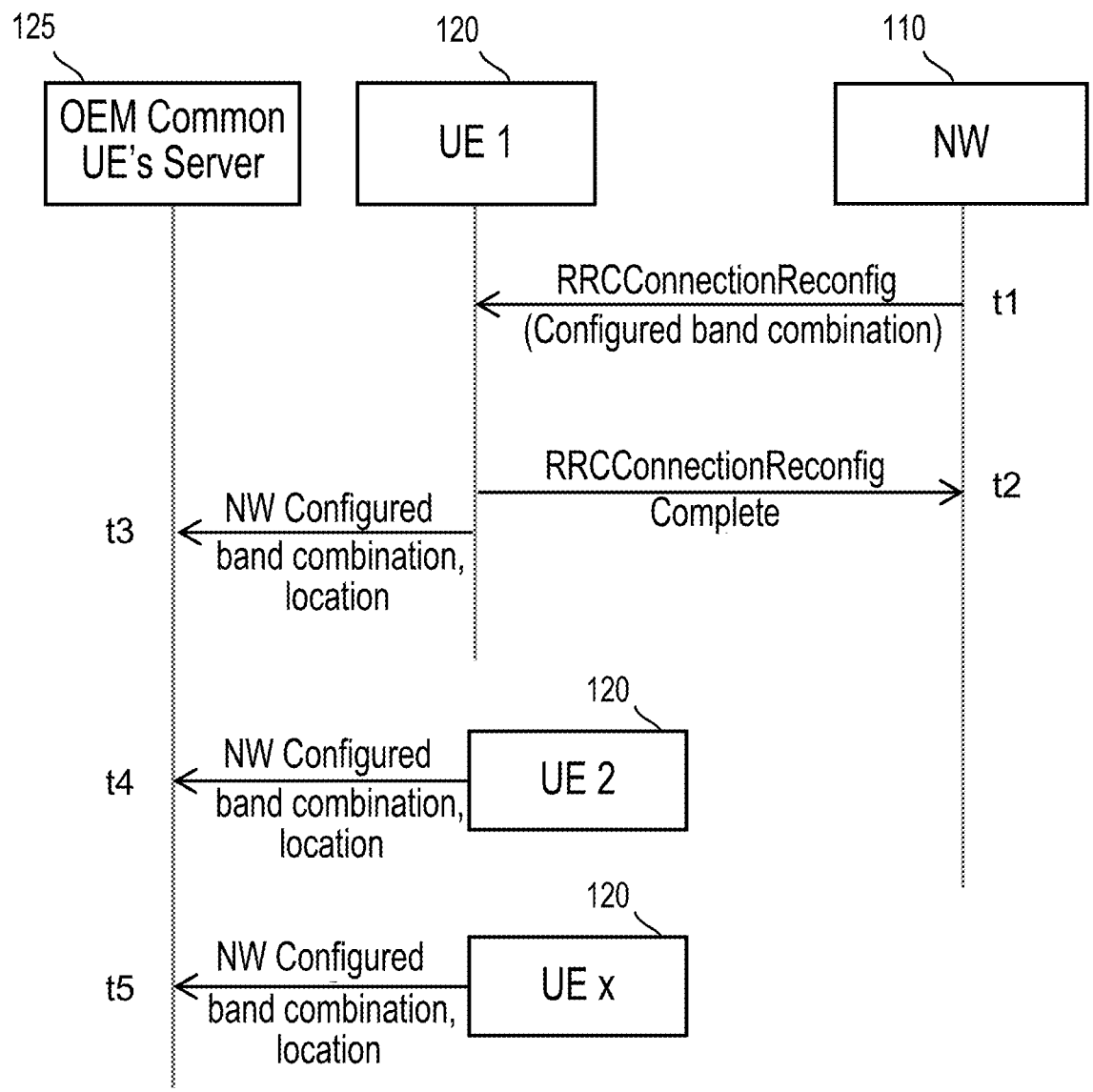
FIG. 8 is a call flow diagram illustrating an example of a method of provisioning an original equipment manufacturer (OEM) server to prioritize band combinations, in accordance with aspects of the present disclosure.

FIG. 8 is a call flow diagram illustrating an example of a method of provisioning an original equipment manufacturer (OEM) server to prioritize band combinations, in accordance with aspects of the present disclosure. In the example of FIG. 8, multiple UEs 120 (e.g., UE 1, UE 2 to UE x) provide information to an OEM server 125 based on information received from a network (NW) device, such as a base station 110 (shown as NW 110 in FIG. 8). At time t1, the base station 110 transmits a reconfiguration message to a first UE 120 (UE 1). The message may be an RRCConnectionReconfiguration message, for example. The message configures band combinations for the first UE 120. At time t2, the first UE 120 responds with a reconfiguration complete message, such as an RRCConnectionReconfigComplete message. FIG. 8 illustrates an example of the communication between the base station 110 and the first UE 120. Similar messaging occurs between the base station 110 and other UEs, such as a second UE 120 (UE 2) through last UE 120 (UE x) to provide network configured band combinations to each of the UEs 120.

At time t3, the first UE 120 (UE 1) transmits the network configured band combinations to the server 125. The first UE 120 also transmits its location to the server 125 at time t3. At time t4, the second UE 120 (UE 2) transmits the network configured band combinations to the server 125. The second UE 120 also transmits its location to the server 125 at time t4. At time t5, the last UE 120 (UE x) transmits the network configured band combinations to the server 125. The last UE 120 also transmits its location to the server 125 at time t5.

The server 125 may also be a carrier-based server. A carrier-based server is maintained by a carrier based on configured band combinations for each area. The carriers already have such information, facilitating building of the server database for band combinations.

FIG. 9 is a table illustrating a band combination database 900 maintained by a server, in accordance with aspects of the present disclosure. The database 900 may store band combinations 904, 906 based on different types of locations

902, such as cell ID, PLMN, TAC, GPS coordinates, history of GPS, etc. The band combinations 904, 906 can be prioritized based on the location 902. For example, for cell ID c1 902, a first band combination 904 is (b1AA+n78AA) is higher priority than a second band combination 906 (b3AA+n78AA). Other prioritized band combinations can be seen for other locations.

In some aspects of the present disclosure, the server 125 may intelligently keep track of a maximum mobility route of the UE 120 for configuring band combinations on neighbor cells. Thus, the server 125 may return a most suitable configured band combination list of neighbor cells, thereby improving the mobility of the UE 120.

Figure 10:
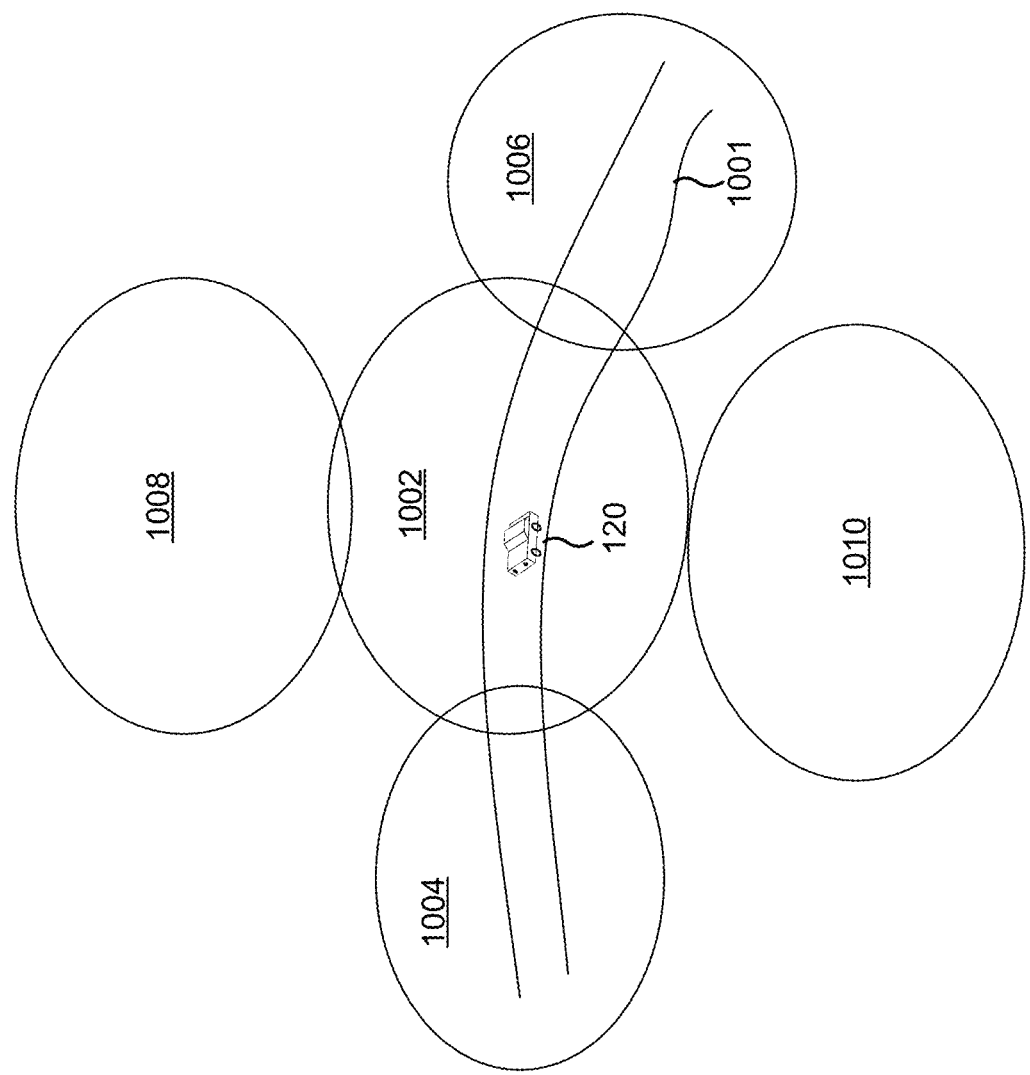
FIG. 10 is a block diagram illustrating an example of tracking user equipment (UE) mobility to prioritize band combinations, in accordance with aspects of the present disclosure.

FIG. 10 is a block diagram illustrating an example of tracking user equipment (UE) mobility to prioritize band combinations, in accordance with aspects of the present disclosure. In FIG. 10, a UE 120 travels along a road 1001. The road 1001 traverses a first cell 1002, a second cell 1004, and a third cell 1006. The road 1001 does not travel through a fourth cell 1008 or a fifth cell 1010. In the example of FIG. 10, the UE 120 is currently located in the first cell 1002. Because the road 1001 does not travel through the fourth cell 1008 or the fifth cell 1010, when the server 125 (not shown) is evaluating neighbor cells, the server 125 may exclude these cells 1008, 1010 from consideration. The server 125 may determine this information based on a history of UE locations. If the history corresponds to the road 1001, the server 125 may deduce that the UE 120 is traveling on the road 1001. Thus, the server 125 returns prioritized band combinations for the first cell 1002, the second cell 1004, and the third cell 1006. In the example of FIG. 10, the first cell 1002 may be an example of a serving cell. Additionally, the second cell 1004 and the third cell 1006 may be examples of neighboring cells (e.g., cells that neighbor the serving cell).

It can be seen that aspects of the present disclosure enhance the UE's coverage. Moreover, a UECapabilityInformation message size may be reduced, as message optimizations are available.

Figure 11:
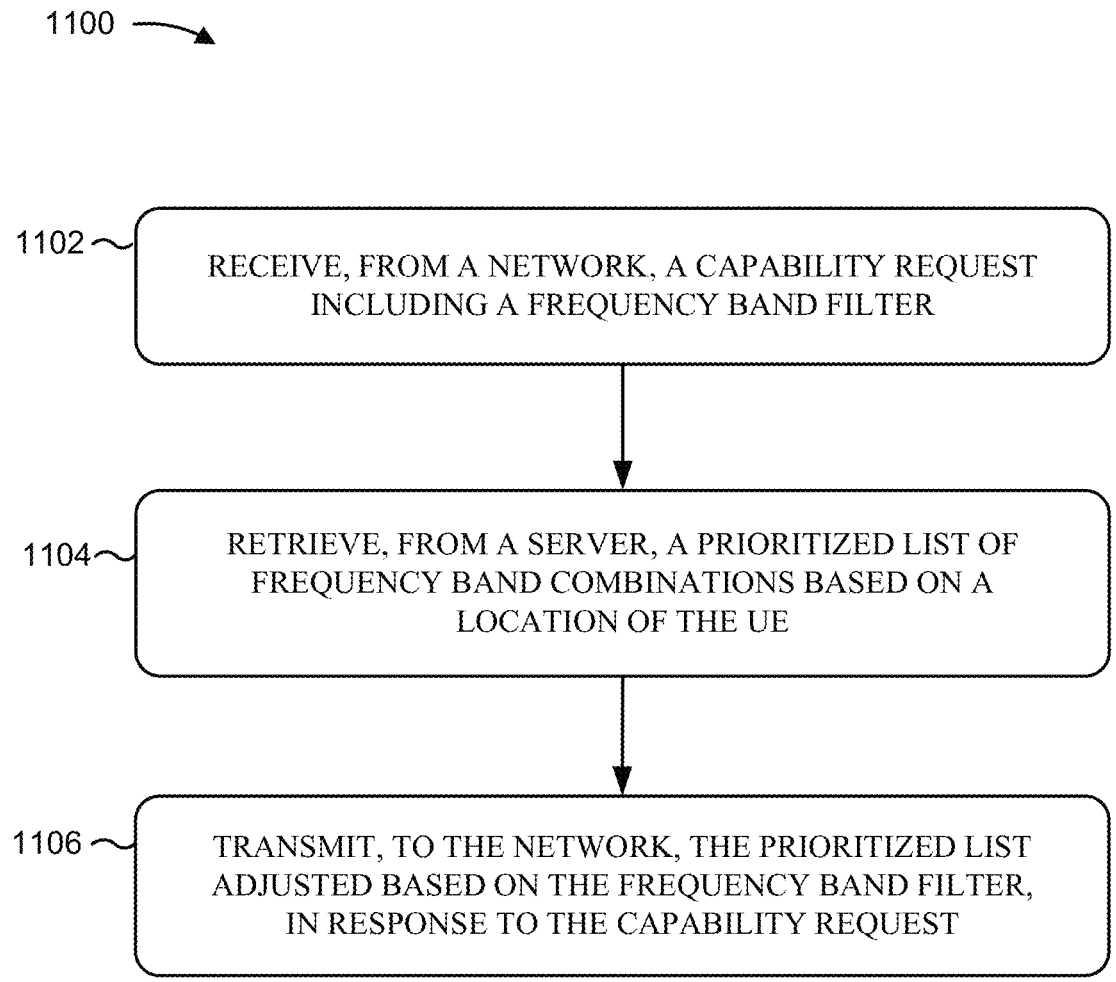
FIG. 11 is a flow diagram illustrating an example process performed, for example, by a user equipment (UE), in accordance with various aspects of the present disclosure.

FIG. 11 is a flow diagram illustrating an example process 1100 performed, for example, by a user equipment (UE), in accordance with various aspects of the present disclosure. The example process 1100 is an example of artificial intelligence (AI)-based prioritization of band combinations reported in user equipment (UE) capability messages. The operations of the process 1100 may be implemented by a UE 120. At block 1102, the user equipment (UE) receives, from a network, a capability request including a frequency band filter. For example, the UE (e.g., using the antenna 252, DEMOD/MOD 254, the MIMO detector 256, receive processor 225, controller/processor 280, and/or the like) may receive the capability request.

At block 1104, the user equipment (UE) retrieves, from a server, a prioritized list of frequency band combinations based on a location of the UE. For example, the UE (e.g., using the antenna 252, DEMOD/MOD 254, the MIMO detector 256, receive processor 225, controller/processor 280, memory 282 and/or the like) may retrieve the priority list. In some aspects, the location is a history of locations of the UE. In other aspects, the location is a cell identifier (ID), a public land mobile network (PLMN) ID, a tracking area code, global positioning system (GPS) coordinates, or a history of GPS coordinates. The prioritized list may include frequency band combinations for a serving cell and frequency band combinations for at least one neighbor cell.

At block 1106, the user equipment (UE) transmit, to the network, the prioritized list adjusted based on the frequency band filter, in response to the capability request. For example, the UE (e.g., using the antenna 252, DEMOD/MOD 254, the transmit MIMO processor 266, transmit processor 264, controller/processor 280, memory 282, and/or the like) may transmit the priority list. In some aspects, the UE may transmit, to the network, a legacy list in response to the prioritized list retrieved from the server being an empty list. In other aspects, the UE may transmit, to the server, a network configured frequency band combination and the location of the UE.

Figure 12:
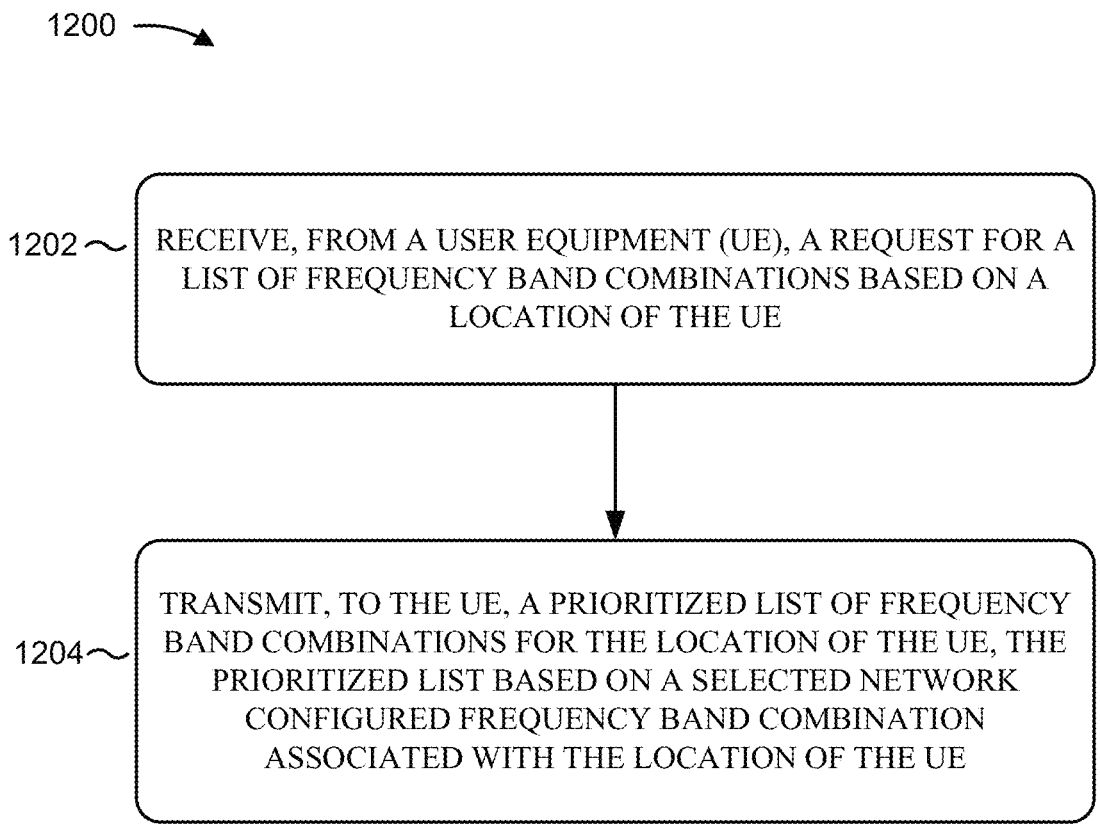
FIG. 12 is a flow diagram illustrating an example process performed, for example, by a network device, in accordance with various aspects of the present disclosure.

FIG. 12 is a flow diagram illustrating an example process 1200 performed, for example, by a network device, in accordance with various aspects of the present disclosure. The example process 1200 is an example of artificial intelligence (AI)-based prioritization of band combinations reported in user equipment (UE) capability messages. The operations of the process 1200 may be implemented by a network device 110.

At block 1202, the network device receives, from a user equipment (UE), a request for a list of frequency band combinations based on a location of the UE. For example, the network device (e.g., using the antenna 234, MOD/DEMOD 232, the MIMO detector 236, receive processor 238, controller/processor 240, and/or the like) may receive the request. The network device may receive, from each of a group of UEs, a network configured frequency band combination and corresponding UE location, and determine the selected network configured frequency band combination based on each of the received network configured frequency band combinations.

At block 1204, the network device transmits, to the UE, a prioritized list of frequency band combinations for the location of the UE, the prioritized list based on a selected network configured frequency band combination associated with the location of the UE. For example, the network device (e.g., using the antenna 234, MOD/DEMOD 232, the transmit MIMO processor 230, transmit processor 220, controller/processor 240, memory 242, and/or the like) may transmit the prioritized list. In some aspects, the prioritized list may be an empty list to trigger updates from the UEs. The prioritized list may include frequency band combinations for a serving cell and frequency band combinations for at least one neighbor cell. In some aspects, the network device may determine the selected network configured frequency band combination based on a predicted route of the UE.

Implementation examples are described in the following numbered clauses.

1. A method of wireless communication by a user equipment (UE), comprising:
   receiving, from a network, a capability request including a frequency band filter;
   retrieving, from a server, a prioritized list of frequency band combinations based on a location of the UE; and
   transmitting, to the network, the prioritized list adjusted based on the frequency band filter, in response to the capability request.

2. The method of clause 1, in which the location comprises a history of locations of the UE.

3. The method of clause 1 or 2, in which the location comprises a cell identifier (ID), a public land mobile network (PLMN) ID, a tracking area code, global positioning system (GPS) coordinates, or a history of GPS coordinates.

4. The method of any of the preceding clauses, in which the prioritized list comprises frequency band combinations for a serving cell and frequency band combinations for at least one neighbor cell.

5. The method of any of the preceding clauses, further comprising transmitting, to the network, a legacy list in response to the prioritized list retrieved from the server being an empty list.

6. The method of any of the preceding clauses, further comprising transmitting, to the server, a network configured frequency band combination and the location of the UE.

7. A method of wireless communication by a network device, comprising:
   receiving, from a user equipment (UE), a request for a list of frequency band combinations based on a location of the UE; and
   transmitting, to the UE, a prioritized list of frequency band combinations for the location of the UE, the prioritized list based on a selected network configured frequency band combination associated with the location of the UE.

8. The method of clause 7, further comprising:
   receiving, from each of a plurality of UEs, a network configured frequency band combination and corresponding UE location; and
   determining the selected network configured frequency band combination based on each of the received network configured frequency band combinations.

9. The method of clause 7 or 8, further comprising transmitting the prioritized list as an empty list to trigger updates from the plurality of UEs.

10. The method of any of the clauses 7-9, in which the prioritized list comprises frequency band combinations for a serving cell and frequency band combinations for at least one neighbor cell.

11. The method of any of the clauses 7-10, further comprising determining the selected network configured frequency band combination based on a predicted route of the UE.

12. The method of any of the clauses 7-11, further comprising receiving, from a wireless carrier, a network configured frequency band combination and corresponding area; and
   determining the selected network configured frequency band combination based on the received network configured frequency band combination.

13. An apparatus for wireless communication by a user equipment comprising:
   a memory; and
   at least one processor coupled to the memory, the at least one processor configured:
     to receive, from a network, a capability request including a frequency band filter;
     to retrieve, from a server, a prioritized list of frequency band combinations based on a location of the UE; and
     to transmit, to the network, the prioritized list adjusted based on the frequency band filter, in response to the capability request.

14. The apparatus of clause 13, in which the location comprises a history of locations of the UE.

15. The apparatus of clause 13 or 14, in which the location comprises a cell identifier (ID), a public land mobile network (PLMN) ID, a tracking area code, global positioning system (GPS) coordinates, or a history of GPS coordinates.

16. The apparatus of any of the clauses 13-15, in which the prioritized list comprises frequency band combinations for a serving cell and frequency band combinations for at least one neighbor cell.

17. The apparatus of any of the clauses 13-16, in which the at least one processor is further configured to transmit, to the network, a legacy list in response to the prioritized list retrieved from the server being an empty list.

18. The apparatus of any of the clauses 13-17, in which the at least one processor is further configured to transmit, to the server, a network configured frequency band combination and the location of the UE.

19. An apparatus comprising:
   a memory; and
   at least one processor coupled to the memory, the at least one processor configured:
     to receive, from a user equipment (UE), a request for a list of frequency band combinations based on a location of the UE; and
     to transmit, to the UE, a prioritized list of frequency band combinations for the location of the UE, the prioritized list based on a selected network configured frequency band combination associated with the location of the UE.

20. The apparatus of clause 19, in which the at least one processor is further configured:
   to receive, from each of a plurality of UEs, a network configured frequency band combination and corresponding UE location; and
   to determine the selected network configured frequency band combination based on each of the received network configured frequency band combinations.

21. The apparatus of clause 19 or 20, in which the at least one processor is further configured to transmit the prioritized list as an empty list to trigger updates from the plurality of UEs.

22. The apparatus of any of the clauses 19-21, in which the prioritized list comprises frequency band combinations for a serving cell and frequency band combinations for at least one neighbor cell.

23. The apparatus of any of the clauses 19-22, in which the at least one processor is further configured determine the selected network configured frequency band combination based on a predicted route of the UE.

24 The apparatus of any of the clauses 19-23, in which the at least one processor is further configured:
   to receive, from a wireless carrier, a network configured frequency band combination and corresponding area; and
   to determine the selected network configured frequency band combination based on the received network configured frequency band combination.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   receiving, from a network, a capability request including a list of network supported bands;
   retrieving, from a server, a prioritized list of frequency band combinations based on a location of the UE; and
   transmitting, to the network, a UE capability information message advertising UE supported band combinations filtered in accordance with the prioritized list, in response to the capability request.

2. The method of claim 1, in which the location comprises a history of locations of the UE.

3. The method of claim 1, in which the location comprises a cell identifier (ID), a public land mobile network (PLMN) ID, a tracking area code, global positioning system (GPS) coordinates, or a history of GPS coordinates.

4. The method of claim 1, in which the prioritized list comprises frequency band combinations for a serving cell and frequency band combinations for at least one neighbor cell.

5. The method of claim 1, further comprising transmitting, to the network, a legacy list in response to the prioritized list retrieved from the server being an empty list.

6. The method of claim 1, further comprising transmitting, to the server, a network configured frequency band combination and the location of the UE.

7. A method of wireless communication by a network device, comprising:
   receiving, from a user equipment (UE), a request for a list of frequency band combinations based on a location of the UE; and
   transmitting, to the UE, a prioritized list of frequency band combinations for the location of the UE, the prioritized list based on a selected network configured frequency band combination associated with the location of the UE.

8. The method of claim 7, further comprising:
   receiving, from each of a plurality of UEs, a network configured frequency band combination and corresponding UE location; and
   determining the selected network configured frequency band combination based on each of the received network configured frequency band combinations.

9. The method of claim 8, further comprising transmitting the prioritized list as an empty list to trigger updates from the plurality of UEs.

10. The method of claim 7, in which the prioritized list comprises frequency band combinations for a serving cell and frequency band combinations for at least one neighbor cell.

11. The method of claim 10, further comprising determining the selected network configured frequency band combination based on a predicted route of the UE.

12. The method of claim 7, further comprising receiving, from a wireless carrier, a network configured frequency band combination and corresponding area; and
    determining the selected network configured frequency band combination based on the received network configured frequency band combination.

13. An apparatus for wireless communication by a user equipment (UE), comprising:
    a memory; and
    at least one processor coupled to the memory, the at least one processor configured:
      to receive, from a network, a capability request including a list of network supported bands;
      to retrieve, from a server, a prioritized list of frequency band combinations based on a location of the UE; and
      to transmit, to the network, a UE capability information message advertising UE supported band combinations filtered in accordance with the prioritized list, in response to the capability request.

14. The apparatus of claim 13, in which the location comprises a history of locations of the UE.

15. The apparatus of claim 13, in which the location comprises a cell identifier (ID), a public land mobile network (PLMN) ID, a tracking area code, global positioning system (GPS) coordinates, or a history of GPS coordinates.

16. The apparatus of claim 13, in which the prioritized list comprises frequency band combinations for a serving cell and frequency band combinations for at least one neighbor cell.

17. The apparatus of claim 13, in which the at least one processor is further configured to transmit, to the network, a legacy list in response to the prioritized list retrieved from the server being an empty list.

18. The apparatus of claim 13, in which the at least one processor is further configured to transmit, to the server, a network configured frequency band combination and the location of the UE.

19. An apparatus comprising:
a memory; and
at least one processor coupled to the memory, the at least one processor configured:
  to receive, from a user equipment (UE), a request for a list of frequency band combinations based on a location of the UE; and
  to transmit, to the UE, a prioritized list of frequency band combinations for the location of the UE, the prioritized list based on a selected network configured frequency band combination associated with the location of the UE.

20. The apparatus of claim 19, in which the at least one processor is further configured:
  to receive, from each of a plurality of UEs, a network configured frequency band combination and corresponding UE location; and
  to determine the selected network configured frequency band combination based on each of the received network configured frequency band combinations.

21. The apparatus of claim 20, in which the at least one processor is further configured to transmit the prioritized list as an empty list to trigger updates from the plurality of UEs.

22. The apparatus of claim 19, in which the prioritized list comprises frequency band combinations for a serving cell and frequency band combinations for at least one neighbor cell.

23. The apparatus of claim 22, in which the at least one processor is further configured to determine the selected network configured frequency band combination based on a predicted route of the UE.

24. The apparatus of claim 19, in which the at least one processor is further configured:
  to receive, from a wireless carrier, a network configured frequency band combination and corresponding area; and
  to determine the selected network configured frequency band combination based on the received network configured frequency band combination.

* * * * *